Aug. 11, 1936. F. MEAD 2,050,441
RESILIENT OR CUSHION WHEEL
Filed Nov. 7, 1931 3 Sheets-Sheet 1
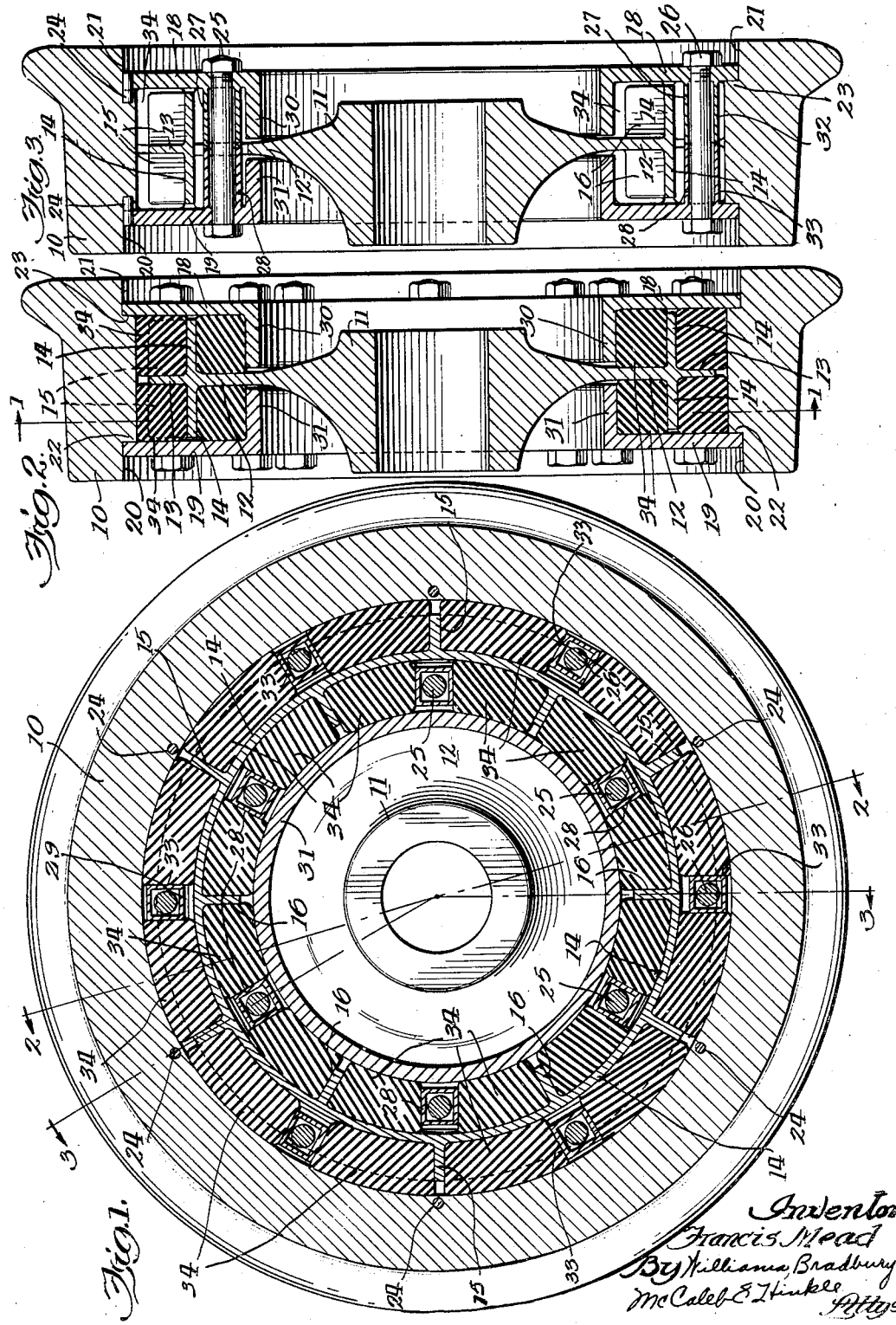

Aug. 11, 1936.  F. MEAD  2,050,441
RESILIENT OR CUSHION WHEEL
Filed Nov. 7, 1931   3 Sheets-Sheet 2
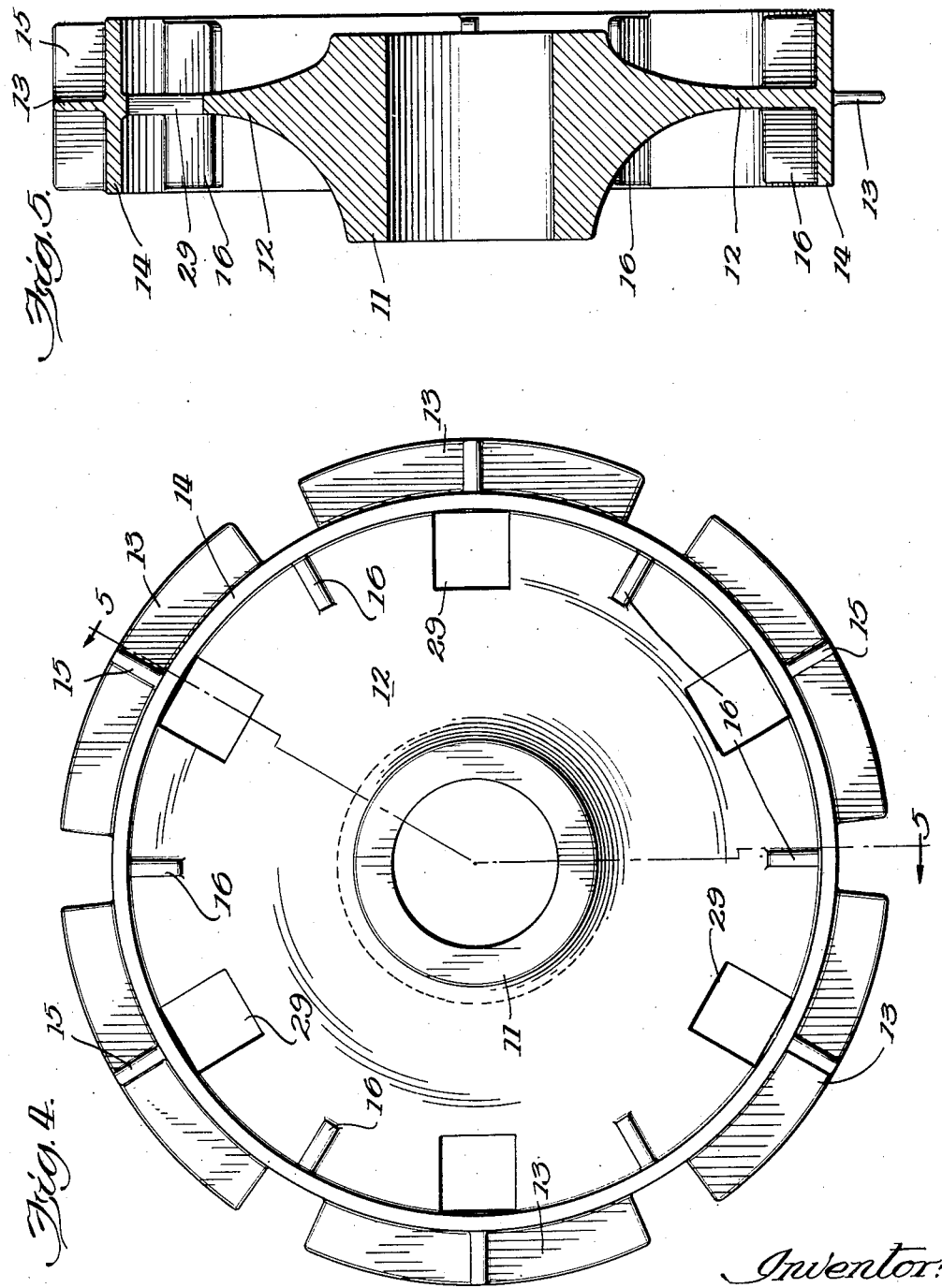

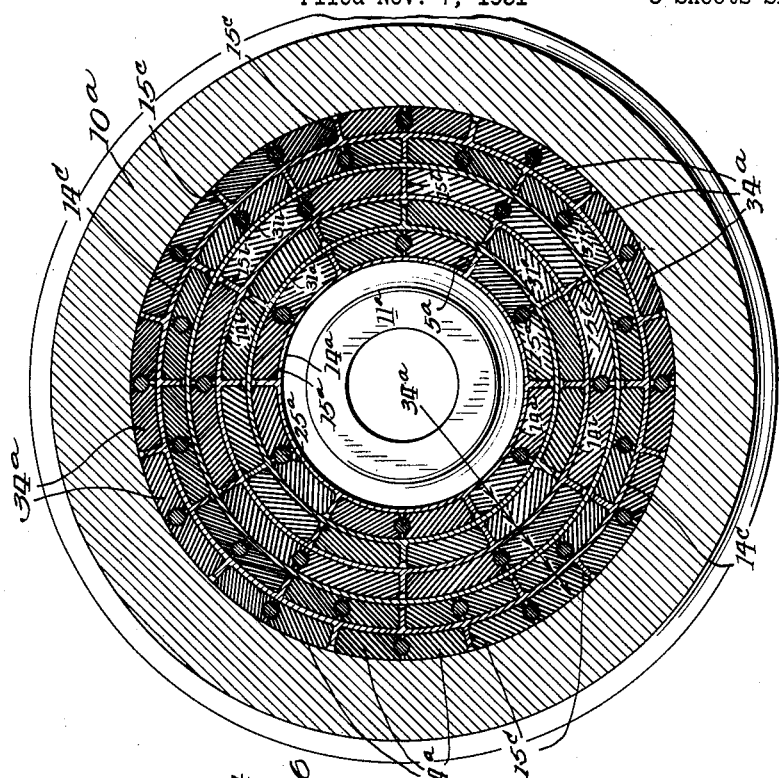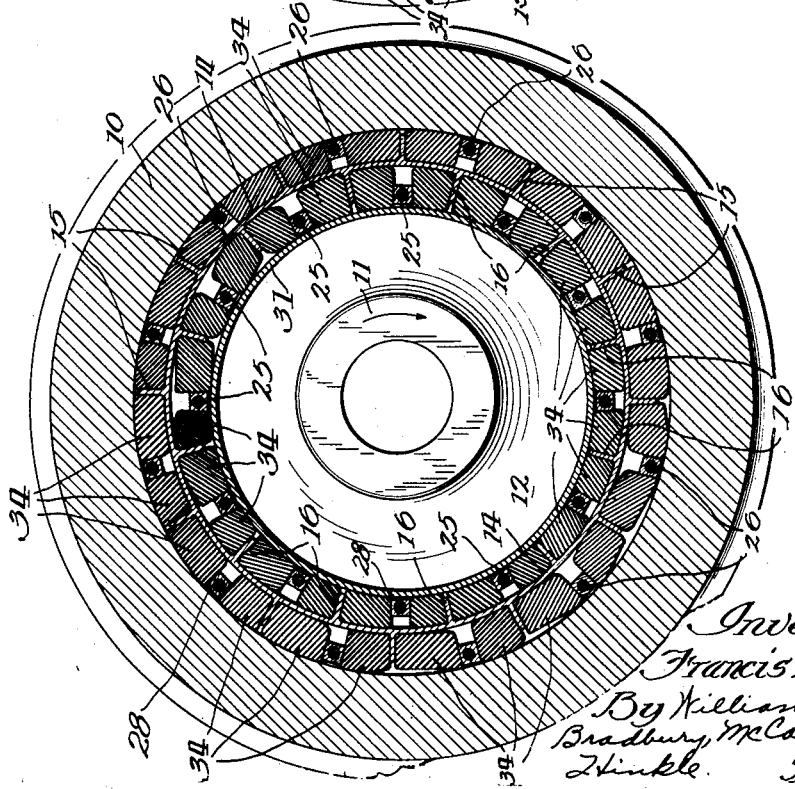

Patented Aug. 11, 1936

2,050,441

UNITED STATES PATENT OFFICE 2,050,441

RESILIENT OR CUSHION WHEEL

Francis Mead, Chicago, Ill.

Application November 7, 1931, Serial No. 573,617

10 Claims. (Cl. 295—11)

My invention relates to resilient or cushion wheels for vehicles.

More particularly it relates to wheels wherein a plurality of elastic elements are interposed between a rigid rim and hub, the elastic elements permitting some relative movement between rim and hub and, by their resilient action, serving to absorb the shocks to which the wheel is subject.

One of the objects of my invention is to provide an improved resilient or cushion wheel.

Another object is to provide a wheel wherein the cushioning effect is distributed throughout all of the elastic elements instead of being concentrated upon a part only of such elements, as heretofore.

Another object is to provide a wheel of increased cushioning capacity.

A further object is to provide a wheel which may be made relatively light without sacrificing strength or resiliency.

Other objects and advantages will hereinafter appear.

Embodiments of the invention are illustrated in the accompanying drawings, wherein:

Fig. 1 is a vertical section of a railway car wheel having tandem sets of elastic cushioning elements, the parts being illustrated in the relative positions they assume when the wheel is not under load;

Fig. 2 is a section on the line 2—2 of Fig. 1;

Fig. 3 is a section on the line 3—3 of Fig. 1;

Fig. 4 is an enlarged elevational view of the hub of the wheel shown in Fig. 1;

Fig. 5 is a section on the line 5—5 of Fig. 4;

Fig. 6 is a section similar to Fig. 1 drawn to a reduced scale and with the wheel under load; and Fig. 7 is a similar section through a wheel having five concentric sets of elastic cushioning elements.

Referring first to Figs. 1 to 5, the wheel has a rigid rim 10 which is shown as of the flanged railway car type and may be formed in any approved manner from appropriate metals to possess the desired strength, rigidity and wearing qualities. Within the circle defined by the rim but entirely out of contact therewith is a central hub 11. This hub is bored to fit the axle by which it is turned or with which it turns, depending, of course, upon whether the wheel is a drive-load wheel or merely a load supporting wheel. Hub 11 is radially extended to form a circular web 12 which terminates radially in a plurality of vertically aligned but circumferentially spaced fins 13; six such fins being employed in the particular embodiment illustrated, as most clearly shown in Fig. 4. The external diameter of the hub, including fins 13, is less than the internal diameter of rim 10 so as to leave sufficient radial clearance therebetween to permit the relative radial movements afforded by the cushioning elements hereinafter described. At the base of fins 13, web 12 is provided with two oppositely projecting annular flanges 14 which, at intervals, are provided with or formed into outwardly projecting radial wings 15 and, preferably in alteration, with inwardly projecting radial wings 16. In the embodiment chosen for illustration there are six inner wings and six outer wings, as shown most clearly in Fig. 4. The hub, including its web, fins, flanges and wings, may, as shown, be formed integrally or the parts thereof may be formed separately and secured together in any appropriate manner.

A pair of annular side plates 18 and 19, of substantially L-shaped cross section, fit snugly into annular recesses 20 and 21, respectively, formed in the outside and inside edges of rim 10, and against shoulders 22 and 23 respectively. Preferably side plates 18 and 19 are seated within recesses 20 and 21 against shoulders 22 and 23 with a press fit in order that there may be no looseness between them and the rim. Prevention of relative rotation between the rim and side plates 18 and 19 may be further insured by dowel pins 24 which may be tightly fitted into aligned openings in the rim shoulders and the side plates or, if desired, these pins may be formed integrally either with the rim or the side plates and snugly to fit recesses provided in the other element. Side plates 18 and 19 are rigidly clamped together in spaced relation by two sets of bolts 25 and 26, which, for convenience, may be respectively termed the inner and outer sets of bolts. The inner sets of bolts 25 pass through aligned openings in plates 18 and 19 and loosely through two aligned interposed metal bushings 27 and 28. The bolts with their encircling bushings extend through openings 29 in hub-web 12, there being some clearance between the bushings and the respective web openings. Bushings 27 and 28 may be formed integrally with the associated side plates 18 or 19 or formed separately and rigidly secured thereto by welding or other appropriate method. These bushings may be of any desired shape in cross section but, particularly when the wheel is of the drive-load type, I prefer to use bushings of substantially square cross section, as shown most clearly in Fig. 1.

The length of the bushings is such that when they are brought tightly together longitudinally, by the tightening up of bolts 25, their overall length is sufficient to hold the inner edges of the flanges 30 and 31 of side plates 18 and 19 separated from the web of the wheel hub, as shown clearly in Figs. 2 and 3. The outer set of bolts 26 lie within the spaces between the radial fins 13 and extend through aligned openings in side plates 18 and 19. These bolts, like the inner set of bolts, are provided with side plate separating bushings 32 and 33.

Thus the side plates 18 and 19, when the wheel is assembled, form in effect two radially and axially directed annular flanges for the rim, these flanges enclosing part of the web, the fins, the annular flanges and the wings of the hub. These rim flanges and the hub flanges define two concentric annular spaces which are divided circumferentially into pockets by the radial wings associated with the hub and the bushinged bolts associated with the rim. These pockets are filled with elastic cushioning elements 34, preferably in the form of curved blocks of rubber. Before assembly these elastic blocks are in all directions, except axially, of dimensions such that they rather snugly fit the pockets into which they are to be placed. Axially the blocks are somewhat larger than the axial dimensions of the pockets so that, in assembly, when the rim side plates are rigidly bolted together the blocks are under compression in an axial direction. This initial compression in an axial direction insures that the web of the wheel hub will be retained in its proper position with sufficient clearance for the cushioned movement between the outer edges of its annular flanges 14 and the side plates and between the inner flanges 30 and 31 of those side plates and the hub web.

In operation the inner surface of the wheel rim and its flanges have all of the vertical weight-load on the axle transmitted thereto from the hub by the interposed elastic elements. Some of this load is transmitted to the rim and its flanges directly from the hub flanges. In addition the wings associated with the hub of the wheel and the bolt bushings associated with the rim of the wheel act like abutments against which the elastic elements abut and to and from which those elastic elements transmit some of the weight-load and, in the case of drive wheels, the torque load. Thus there is interposed between the load on the axle and the wheel rim concentric rows of elastic elements which transfer the load from axle to rim, but absorb the shocks so that they are not transmitted. And the load and shock absorbing effects are distributed among the cushioning elements instead of, as heretofore, being concentrated chiefly upon those elements in the region of the bottom of the wheel. Thus the vertical weight-load is transmitted from axle to rim by both the outer and inner concentric rows or sets of cushioning elements; those in the outer row, in effect, supporting the wheel hub and those in the inner row, in effect, suspending the wheel hub. In the outer row the support is afforded by most of the cushioning elements, those at the upper side of the wheel having relatively less effect. However, because of the action of the radially disposed abutments between the hub and rim, even those cushioning elements which are in the upper region of the outer row do contribute to the support of the hub. Likewise in the inner row of cushioning elements it is probably true that only those at the bottom or lower side contribute little, if anything, to the suspension of the hub.

If the wheel is a driver in addition to a weight-load conveyor the torque from the axle is transmitted to the rim by friction between the elastic rubber elements and the metal parts contacting therewith and also by the abutments, consisting of the wings on the hub flange and the bolt bushings associated with the rim flanges, and the interposed resilient elements. Thus the torsional shocks due to rapid acceleration, as when applying driving power, and to rapid deceleration, as when applying the brakes, and to other causes is cushioned.

In addition the axial component of shocks and jars and other forces exerted more or less in the direction of the wheel axis, such as those occasioned by going around curves or over tracks where the wheels on opposite sides of the vehicle do not travel at the same level, the elastic elements absorb and cushion the lateral relative movements between the wheel hub and the rim.

The embodiment illustrated in Fig. 7 shows how the characteristic features shown in simplified form in Figs. 1 to 6, and hereinbefore described, may be incorporated in a more complex wheel. Thus, this wheel has five instead of two concentric rows or sets of elastic elements. The hub 11$^a$ has associated therewith a plurality of annular flanges 14$^a$, 14$^b$, and 14$^c$ and associated wings 15$^a$, 15$^b$, and 15$^c$. The rim 10$^a$ has corresponding flanges 30—31$^a$ and 31—31$^b$. Concentric rows of bolts secure the side plates together and serve with the wings as pocket forming abutments for receiving elastic elements 34$^a$. The action of this wheel is essentially the same as that heretofore described in connection with the simplified embodiment.

Having thus illustrated and described the nature and several embodiments of my invention, what I claim and desire to secure by United States Letters Patent is:

1. A cushion wheel comprising a rigid rim having an inwardly and axially projecting annular flange, a rigid hub within and spaced from the rim and floating in relation thereto, an annular flange carried by the hub, a series of wings projecting inwardly and outwardly relative to the flange and rigidly associated with the hub, and two series of annularly related concentrically arranged cushions filling the spaces between the rim and its flange and the hub flange and wings.

2. A cushion wheel comprising a rigid rim having a radially and axially directed annular flange, a rigid hub within and spaced from the rim and its flange, an annular flange carried by the hub and lying between the rim and its flange, a series of radial abutments located at intervals within and without the hub flange and rigidly associated therewith, said abutments separating the annular spaces between the rim and its flange and the hub flange into concentric rows of pockets, and cushions filling the pockets.

3. A cushion wheel comprising a hub, a rigid rim surrounding but spaced from the hub and in floating relation thereto, elastic cushioning elements arranged in a plurality of concentric sets,— one set radially within the other—interposed between the hub and rim, torque abutments fixed on the rim, and torque abutments fixed on the hub, the cushioning elements being interposed radially between the hub and rim and arcuately between the abutments on the rim and abutments on the hub, respectively.

4. A cushion wheel comprising a rigid rim, a rigid hub encircled by the rim with a space therebetween, a plurality of concentric annular rows of spaced elastic elements interposed in the space between the rim and hub, and a plurality of radially disposed abutments, some of which are rigidly associated with the hub and others with the rim, said abutments lying in the spaces between the elastic elements, the abutments associated with the rim alternating with those associated with the hub, whereby some of the elastic elements act to support the hub within the rim and others act to suspend the hub within the rim.

5. A cushion wheel comprising a rigid rim, a rigid hub encircled by the rim at a distance therefrom, a plurality of concentric annular sets of elastic elements interposed between the rim and hub, and a plurality of radially disposed abutments some of which form part of the hub and others form a part of the rim lying in the spaces between the elastic elements, each elastic element being disposed arcuately between an abutment forming part of the hub and an abutment forming a part of the rim.

6. A cushion wheel comprising an outer rim, an inner hub within and spaced from the rim, the hub having axially directed flanges provided with radially directed wings, a pair of side plates projecting inwardly from the rim to partially encompass the flanges and wings of the hub and form therewith a plurality of concentric spaces, means for separating said spaces into a plurality of concentrically arranged pockets, and elastic cushioning elements filling the pockets.

7. A cushion wheel comprising a rigid rim, a rigid hub encircled by the rim with a space therebetween, a plurality of concentric annular rows of spaced elastic elements interposed in the space between the rim and hub, and a plurality of radially disposed abutments, some of which are rigidly associated with the hub and others with the rim, said abutments lying in the spaces arcuately between the elastic elements and abutments associated with the rim alternating with abutments associated with the hub.

8. A cushion wheel comprising an outer rim, an inner hub within and spaced from the rim, the hub having axially directed flanges provided with radially directed wings, a pair of annular side plates attached to the rim and projecting inwardly therefrom to partially encompass the flanges and wings of the hub and form therewith a plurality of concentric spaces, means for separating said spaces into a plurality of concentrically arranged pockets, and elastic cushion elements filling the pockets.

9. A cushion wheel comprising a rigid rim, a rigid hub encircled by the rim with a space therebetween, said hub having oppositely and axially directed flanges provided with oppositely and radially directed wings, a pair of side plates projecting inwardly from the rim to partially encompass the flanges and wings of the hub and form therewith a plurality of concentric spaces, means interposed between the side plates to clamp the same toward each other and separate said concentric spaces into a plurality of concentrically arranged pockets, and elastic cushioning elements filling the pockets.

10. A cushion wheel comprising a rigid rim having a pair of spaced inwardly and axially projecting annular flanges, a rigid hub within and spaced from the rim and projecting into the space between the rim flanges, said hub having oppositely and axially directed flanges provided with oppositely and radially directed wings, said rim and its flanges and the hub and its flanges and wings forming a plurality of concentric sets of pockets between the rim and the hub, and an elastic cushioning element snugly fitting each of said pockets, the normal axial dimension of the elastic cushioning elements being greater than the axial dimension of said pockets whereby said cushioning elements are held under compression in an axial direction between said side plates.

FRANCIS MEAD.